United States Patent
Soliman

(10) Patent No.: US 9,402,277 B2
(45) Date of Patent: Jul. 26, 2016

(54) PROXY SERVER FOR FACILITATING POWER CONSERVATION IN WIRELESS CLIENT TERMINALS

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1119 days.

(21) Appl. No.: 12/041,644

(22) Filed: Mar. 3, 2008

(65) Prior Publication Data

US 2009/0221261 A1    Sep. 3, 2009

(51) Int. Cl.
| | |
|---|---|
| *H04B 7/185* | (2006.01) |
| *H04W 88/04* | (2009.01) |
| *H04W 68/00* | (2009.01) |
| *H04W 88/18* | (2009.01) |
| *H04W 52/02* | (2009.01) |

(52) U.S. Cl.
CPC .......... *H04W 88/04* (2013.01); *H04W 52/0216* (2013.01); *H04W 68/00* (2013.01); *H04W 88/182* (2013.01)

(58) Field of Classification Search
CPC .................................................. H04W 88/182
USPC ......... 455/7, 11.1, 13.1, 15, 574, 127.5, 41.2; 370/226, 315, 601, 492, 338
See application file for complete search history.

(56) References Cited

U.S. PATENT DOCUMENTS

| | | |
|---|---|---|
| 5,978,366 A | 11/1999 | Massingill et al. |
| 6,519,447 B1 | 2/2003 | Chang et al. |
| 6,968,153 B1 * | 11/2005 | Heinonen et al. ............ 455/11.1 |
| 7,146,130 B2 | 12/2006 | Hsu et al. |
| 7,269,629 B2 | 9/2007 | Zmudzinski et al. |
| 7,349,355 B2 | 3/2008 | Sengupta et al. |

(Continued)

FOREIGN PATENT DOCUMENTS

| | | |
|---|---|---|
| CN | 1323495 A | 11/2001 |
| CN | 1823495 A | 8/2006 |

(Continued)

OTHER PUBLICATIONS

International Search Report and Written Opinion—PCT/US09/034593, International Searching Authority—European Patent Office, Jul. 30, 2009.

(Continued)

*Primary Examiner* — Tu X Nguyen
(74) *Attorney, Agent, or Firm* — Charles Chesney

(57) ABSTRACT

A novel power conservation scheme is provided for conserving power in client terminals by using a proxy server. The client terminal, having a low-power communication interface and a high-power communication interface, may power down its high-power communication interface, to conserve power. Prior to shutting off its high-power communication interface, the client terminal may assign a host terminal to act as a proxy for the client terminal. The host terminal monitors the paging channels for the client terminal via a high-power communication interface. If the host terminal detects a paging message for the client terminal, it forwards at least a portion of the paging message to the client terminal via a low-power communication interface. Upon receipt of the paging message from the host terminal via its low-power communication interface, the client terminal may power up its high-power communication interface and directly respond to an access terminal that initiated the paging message.

31 Claims, 8 Drawing Sheets

(56) References Cited

U.S. PATENT DOCUMENTS

| | | | |
|---|---|---|---|
| 7,395,097 B2* | 7/2008 | Perdomo et al. | 455/574 |
| 7,629,963 B1 | 12/2009 | Wright | |
| 8,527,017 B2 | 9/2013 | Soliman et al. | |
| 8,566,594 B2 | 10/2013 | Soliman et al. | |
| 2003/0194987 A1 | 10/2003 | Pattabiraman et al. | |
| 2003/0198196 A1 | 10/2003 | Bahl et al. | |
| 2004/0063451 A1* | 4/2004 | Bonta | H04W 88/04 455/519 |
| 2004/0128310 A1* | 7/2004 | Zmudzinski et al. | 707/102 |
| 2004/0203377 A1* | 10/2004 | Eaton et al. | 455/41.2 |
| 2005/0079817 A1* | 4/2005 | Kotola et al. | 455/41.2 |
| 2005/0136834 A1* | 6/2005 | Bonta et al. | 455/11.1 |
| 2006/0092888 A1 | 5/2006 | Jeong et al. | |
| 2006/0140196 A1 | 6/2006 | Tanaka et al. | |
| 2006/0218396 A1 | 9/2006 | Laitinen et al. | |
| 2006/0293079 A1 | 12/2006 | Bahl et al. | |
| 2007/0004436 A1 | 1/2007 | Stirbu | |
| 2007/0015523 A1 | 1/2007 | Prakash et al. | |
| 2007/0105496 A1* | 5/2007 | Bonta et al. | 455/13.1 |
| 2007/0189256 A1 | 8/2007 | Oh | |
| 2007/0204160 A1 | 8/2007 | Chan et al. | |
| 2007/0234041 A1 | 10/2007 | Lakshmeshwar et al. | |
| 2007/0242647 A1 | 10/2007 | Bennett | |
| 2008/0016230 A1 | 1/2008 | Holtmanns et al. | |
| 2008/0123640 A1 | 5/2008 | Bhatia et al. | |
| 2008/0189440 A1 | 8/2008 | Goyal et al. | |
| 2008/0192666 A1* | 8/2008 | Koskan et al. | 370/311 |
| 2008/0259912 A1 | 10/2008 | Wang et al. | |
| 2008/0261529 A1* | 10/2008 | Rosenblatt | 455/41.3 |
| 2009/0017844 A1 | 1/2009 | Li et al. | |
| 2009/0209232 A1 | 8/2009 | Cha et al. | |
| 2009/0219844 A1 | 9/2009 | Soliman | |
| 2009/0221303 A1 | 9/2009 | Soliman | |
| 2009/0325622 A1 | 12/2009 | Matsumura et al. | |
| 2010/0097993 A1 | 4/2010 | Hirano et al. | |
| 2010/0271978 A1 | 10/2010 | Gupta et al. | |
| 2011/0131414 A1 | 6/2011 | Cheng et al. | |
| 2011/0255444 A1 | 10/2011 | Soliman et al. | |
| 2011/0264913 A1 | 10/2011 | Nikander et al. | |

FOREIGN PATENT DOCUMENTS

| | | |
|---|---|---|
| CN | 200966070 Y | 10/2007 |
| CN | 101114861 B | 12/2010 |
| GB | 2396525 B | 5/2006 |
| JP | 2000102069 A | 4/2000 |
| JP | 2002335255 A | 11/2002 |
| JP | 2003521135 A | 7/2003 |
| JP | 2004032319 | 1/2004 |
| JP | 2007096988 | 4/2007 |
| JP | 2007140590 A | 6/2007 |
| TW | I291638 B | 12/2007 |
| WO | 0042807 A1 | 7/2000 |
| WO | WO-0120940 A1 | 3/2001 |
| WO | 0217564 A2 | 2/2002 |
| WO | WO-2004077753 A2 | 9/2004 |
| WO | 2007056467 A1 | 5/2007 |
| WO | WO2009009385 | 1/2009 |
| WO | WO-2009111179 A1 | 9/2009 |
| WO | WO-2009111180 A1 | 9/2009 |
| WO | WO2009130796 A1 | 10/2009 |
| WO | WO-2009152367 | 12/2009 |

OTHER PUBLICATIONS

Chaubey, U.S. Appl. No. 12/366,883, entitled, "Partitioned Proxy Server for Facilitating Power Conservation in Wireless Client Terminals" filed Feb. 6, 2009.

Bluetooth Specification Version 2.0, Nov. 4, 2004.

Universal Mobile Telecommunications System (UMTS); Physical channels and mapping of transport channels onto physical channels (FDD), (3GPP TS 25.211 version 6.7.0 Release 6), Dec. 2005.

Universal Mobile Telecommunications System (UMTS); User Equipment (UE) procedures in idle mode and procedures for cell reselection in connected mode, (3GPP TS 25.304 version 7.1.0 Release 7), Dec. 2006.

"Paging" http://www.umtsworld.com/technology/paging.htm, Mar. 18, 2007 version downloaded from Internet Archive—https://web.archive.org/web/20070318012803/http://www.umtsworld.com/technology/paging.htm.

* cited by examiner

PROXY SERVER FOR FACILITATING POWER CONSERVATION IN WIRELESS CLIENT TERMINALS

BACKGROUND

1. Field

Various features pertain to wireless communication systems. At least one feature pertains to a system and method for facilitating the power conservation in client terminals by using a proxy host terminal to receive and forward paging messages to a client terminal via a secondary communication interface when the client terminal shuts off its primary communication interface.

2. Background

Client terminals, such as laptop computers, personal digital assistant devices, mobile or cellular phones, or any other device with a processor, that communicate with other devices through wireless signals are becoming increasingly popular. Client terminals are typically battery-powered and the amount of power a battery can provide is limited. With consumers using powerful applications that run on the client terminals, particularly entertainment media and imaging applications, conserving battery power is important.

Client terminals may operate in one of several modes, including an "active" mode and an "idle" mode. In active mode, client terminals may actively exchange data with one or more access points (e.g., base stations, Node B, femto cell, etc.) in a wireless communication system, e.g., voice or data calls or sessions. In idle mode, the client terminal may monitor control channels, such as the paging channel (PCH) for paging messages. Such paging messages may include messages that alert the client terminal to the occurrence of an incoming call and control/overhead messages that carry system information and other information for the client terminal. In the idle mode, conventional client terminals may consume a significant amount of power to sustain circuitry needed to monitor a paging channel. That is, the client terminal may periodically turn its receiver on to listen for paging messages over its paging channel. Such cycling of the receiver results in significant power consumption. For example, in a communication device that is compliant with Code Division Multiple Access (CDMA) (including Wideband Code Division Multiple Access (W-CDMA)) and/or Global System for Mobile Communications (GSM) standards, current consumption in idle mode may be as high as few milli-amperes (mA) as a result of cycling the receiver on and off.

As a result of this current consumption, the available battery power of the client terminal decreases, shortening the standby time between battery recharges and the talk time when a call is placed or received.

Therefore, there is a need for a solution that reduces power consumption of a client terminal while it is in idle mode.

SUMMARY

One feature provides a system and method for facilitating power conservation in a client terminal by using a proxy host terminal to listen for paging messages for the client terminal while the client terminal shuts off its primary communication interface.

A host terminal may include a first communication interface (e.g., high power or long range interface), a second communication interface (e.g., low power or short range interface), and a processing circuit coupled between the first and second communication interfaces. The first communication interface may be used for communicating with an access point. The second communication interface may be used for communications with a client terminal. The processing circuit may be configured to (a) receive a notification from the client terminal to operate as a proxy for the client terminal, (b) add the client terminal to a proxy list, (c) listen for paging messages on paging channels for the client terminal via the first communication interface, (d) send at least a portion of a received paging message to the client terminal via the second communication interface, (e) remove the client terminal from the proxy list after the portion of the paging message is sent to the client terminal, (f) and/or acknowledge the notification from the client terminal to operate as the proxy.

The first communication interface may consume relatively more power than the second communication interface for a given time of operation. For instance, the first communication interface may have a longer range than the second communication interface and/or the first communication interface may have a greater bandwidth than the second communication interface. In some implementations, the paging message may be translated from a first communication protocol associated with the first communication interface to a second communication protocol associated with the second communication interface. In one example, the first communication interface may be a Code Division Multiple Access (CDMA) compliant interface and the second communication interface is any Bluetooth compliant interface. At least one of the first communication interface and the second communication interface may be a wireless communication interface. The host terminal may operate as a proxy for a plurality of client terminals by monitoring paging channels associated with the plurality of client terminals.

The proxy notification from the client terminal to the host terminal may include a client identifier, one or more paging channels associated with the client terminal, at least one of a traffic channel and/or a sector.

The paging message (or portion of the paging message) sent by the host terminal to the client terminal may be sufficient for the client terminal to respond to the paging message directly to the access point via the first communication interface. For example, the paging message may include a network identifier, system identifier, access point identifier, paging identifier, and/or other parameters that allow the client terminal to contact the paging access point and/or respond to the paging message.

Similarly, a method operational on a host terminal is also provided, comprising: (a) receiving a notification from a client terminal to operate as a proxy for the client terminal; (b) adding the client terminal to a proxy list; (c) listening for paging messages on paging channels for the client terminal via a first communication interface; (d) translating the portion of the paging message from a first communication protocol associated with the first communication interface to a second communication protocol associated with the second communication interface; (e) sending at least a portion of a paging message to the client terminal via a second communication interface; and/or (f) removing the client terminal from the proxy list after the portion of the paging message is sent to the client terminal via the second communication interface.

Consequently, a host terminal is provided, comprising: (a) means for receiving a notification from a client terminal to operate as a proxy for the client terminal; (b) means for listening for paging messages on paging channels for the client terminal via a first communication interface; (c) translating the portion of the paging message from a first communication protocol associated with the first communication interface to a second communication protocol associated with the second communication interface; (d) means for sending at least a portion of a paging message to the client terminal via a second communication interface.

Similarly, a processor readable medium is provided having one or more instructions operational on a host terminal for facilitating power consumption in client terminals, which when executed by a processor causes the processor to: (a) receive a notification from a client terminal to operate as a proxy for the client terminal; (b) listen for paging messages on paging channels for the client terminal via a first communication interface; (c) translate the portion of the paging message from a first communication protocol associated with the first communication interface to a second communication protocol associated with the second communication interface; (d) and/or send at least a portion of a paging message to the client terminal via a second communication interface.

A processor including a processing circuit is also provided and configured to (a) receive a notification from a client terminal to operate as a proxy for the client terminal; (b) send a message to the client terminal to power down a primary communication interface at the client terminal; (c) listen for paging messages on paging channels for the client terminal via a first communication interface; (d) transfer the portion of the paging message from the first communication interface to the second communication interface; (e) send at least a portion of a paging message to the client terminal via a second communication interface.

A client terminal is also provided comprising a first communication interface, a second communication interface, and a processing circuit coupled between the first and second communication interfaces. The first communication interface may be used for communicating with an access point. The second communication interface may be used for communicating with a host terminal. The processing circuit configured to (a) send a message to the host terminal requesting it to operate as a proxy for the client terminal; (b) receive an acknowledge from the host terminal agreeing to operate as a proxy from the client terminal; (c) power off the first communication interface; (d) listen for messages from the host terminal over the second communication interface; (e) receive at least a portion of a paging message from the host terminal; (f) power up the first communication interface; and/or (g) respond to the paging message via the first communication interface directly to an access point that initiated the paging message. The received portion of the paging message may be sufficient for the client terminal to respond to the paging message directly to the access point. For example, the portion of the received paging message includes at least one of a traffic channel and a sector. The second communication interface to receive the paging messages may consume less power than using the first communication interface. The first communication interface may have a longer range and/or greater bandwidth than the second communication interface. The message to the host terminal may include at least one paging channel associated with the client terminal to the host terminal. Additionally, at least one of the first communication interface and the second communication interface may be a wireless communication interface.

Similarly, a method operational on a client terminal comprising: (a) sending a message to a host terminal requesting it to operate as a proxy for the client terminal; (b) powering down a first communication interface; (c) listening for paging messages from the host terminal over a second communication interface; (d) receiving at least a portion of a paging message from the host terminal; (e) powering up the first communication interface; and/or (f) responding to the paging message via the first communication interface directly to an access point that initiated the paging message.

Consequently, a client terminal is provided comprising: (a) means for sending a message to a host terminal requesting that it operate as a proxy for the client terminal; (b) means for powering down a first communication interface; (c) means listening for paging messages from the host terminal over a second communication interface; (d) means for receiving at least a portion of a paging message from the host terminal; (e) means for powering up a first communication interface; and/or (f) means for responding to the paging message via the first communication interface directly to an access point that initiated the paging message.

Similarly, a processor readable medium having one or more instructions operational on a client terminal for conserving power at the client terminal, which when executed by a processor causes the processor to: (a) send a message to a host terminal requesting it to operate as a proxy for a client terminal; (b) power down a first communication interface; (c) listen for paging messages from the host terminal over a second communication interface; (d) receive at least a portion of a paging message from the host terminal; (e) power up the first communication interface; (f) respond to the paging message via the first communication interface directly to an access point that initiated the paging message.

Additionally, a processor including a processing circuit is provided, configured to (a) send a message to a host terminal requesting that it operate as a proxy for a client terminal; (b) power down a first communication interface; (c) listen for paging messages from the host terminal over a second communication interface; (d) receive at least a portion of a paging message from the host terminal; (e) power up the first communication interface; and/or (f) respond to the paging message via the first communication interface directly to an access point that initiated the paging message.

An access point device is also provided, comprising: a first, second, and third communication interfaces and a processing circuit coupled to the first, second, and third communication interfaces. The first communication interface may be used for wirelessly communicating with client terminals. The second communication interface may be used for wirelessly communicating with the client terminal, wherein the second communication interface is more power efficient than the first communication interface. The third communication interface may be used for communicating with a network infrastructure, wherein the access point operates to allow client terminals to communicate via the network infrastructure. The processing circuit may be configured to (a) receive a notification from a client terminal to operate as a proxy for the client terminal; (b) add the client terminal to a proxy list upon receiving the notification to operate as a proxy; (c) receive a paging message over the third communication interface; (d) send at least a portion of the received paging message to the client terminal via the second communication interface if the paging message is intended for the client terminal; (e) broadcast the received paging message via the first communication interface otherwise; (f) and/or receive a response to the paging message via the first communication interface; and/or (g) remove the client terminal from the proxy list after the portion of the paging message is sent to the client terminal.

Similarly, a method operational on an access point device is provided, comprising: (a) receiving a notification from the client terminal to operate as a proxy for a client terminal; (b) receiving a paging message over a communication interface to a communication network; (c) adding the client terminal to a proxy list upon receiving the notification to operate as a proxy; (d) sending at least a portion of the received paging message to the client terminal via a second wireless communication interface if the paging message is intended for the client terminal; (e) broadcast the received paging message via a first wireless communication interface otherwise; (f) removing the client terminal from the proxy list after the portion of the paging message is sent to the client terminal; and/or (g) receiving a response to the paging message via the first communication interface.

Consequently, an access point device is provided, comprising (a) means for receiving a notification from the client terminal to operate as a proxy for a client terminal; (b) means for receiving a paging message over a communication interface to a communication network; (c) means for adding the client terminal to a proxy list upon receiving the notification to operate as a proxy; (d) means for sending at least a portion of the received paging message to the client terminal via a second wireless communication interface if the paging message is intended for the client terminal; (e) means for broadcasting the received paging message via a first wireless communication interface otherwise; (f) removing the client terminal from the proxy list after the portion of the paging message is sent to the client terminal; and/or (g) receiving a response to the paging message via the first communication interface.

Similarly, a processor is provided including a processing circuit configured to (a) receive a notification from the client terminal to operate as a proxy for a client terminal; (b) receive a paging message over a communication interface to a communication network; (c) add the client terminal to a proxy list upon receiving the notification to operate as a proxy; (d) send at least a portion of the received paging message to the client terminal via a second wireless communication interface if the paging message is intended for the client terminal; (e) broadcast the received paging message via a first wireless communication interface otherwise; (f) receive a response to the paging message via the first communication interface; and/or (g) remove the client terminal from the proxy list after the portion of the paging message is sent to the client terminal.

Additionally, a processor readable medium is provided having one or more instructions operational on an access point device for conserving power at the client terminal, which when executed by a processor causes the processor to: (a) receive a notification from the client terminal to operate as a proxy for a client terminal; (b) add the client terminal to a proxy list upon receiving the notification to operate as a proxy; (c) receive a paging message over a communication interface to a communication network; (d) send at least a portion of the received paging message to the client terminal via a second wireless communication interface if the paging message is intended for the client terminal; (e) broadcast the received paging message via a first wireless communication interface otherwise; (f) remove the client terminal from the proxy list after the portion of the paging message is sent to the client terminal; and/or (g) receive a response to the paging message via the first communication interface.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
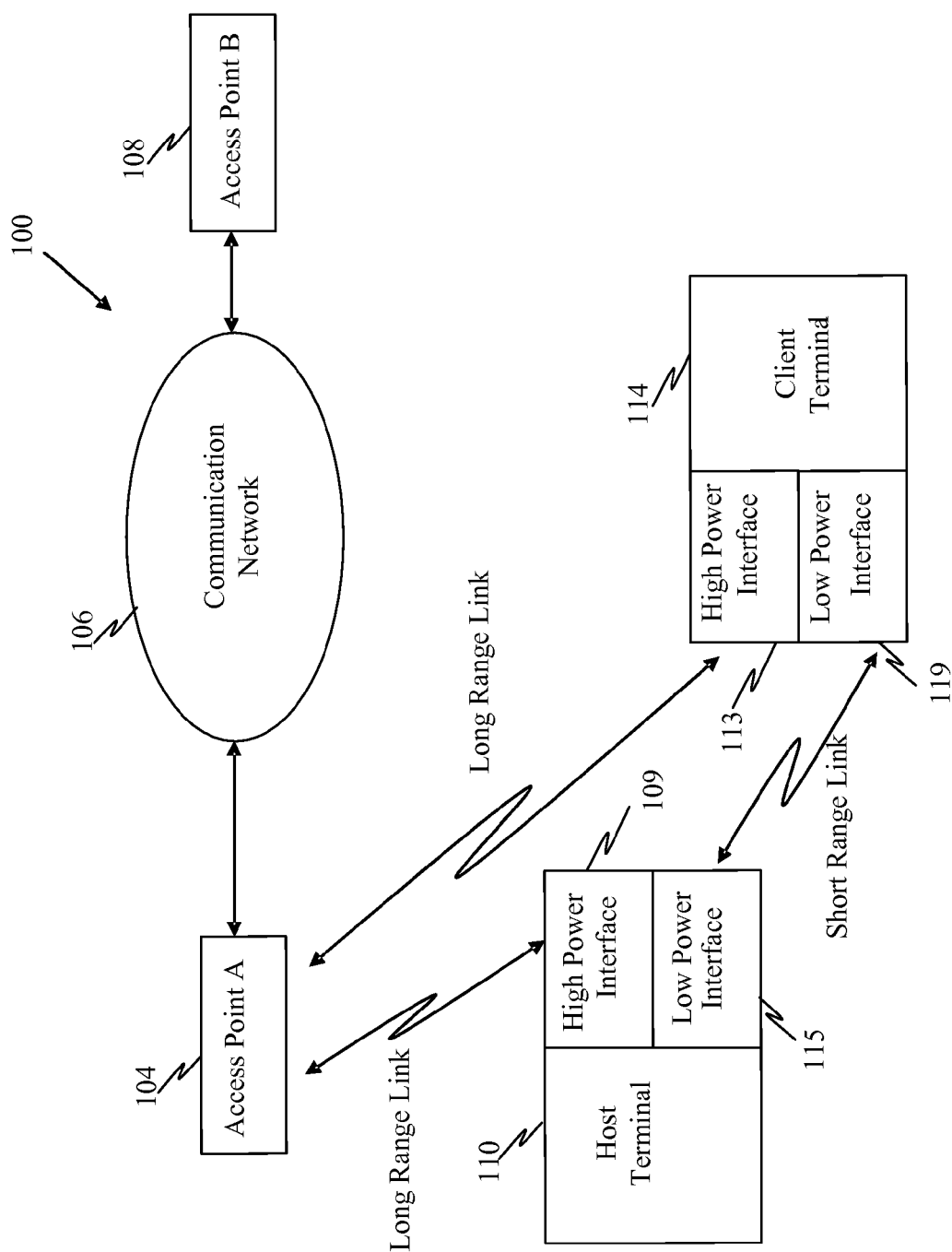
FIG. 1 is a block diagram illustrating a wireless communication system in which a host terminal acts as a proxy to facilitate power conservation in client terminals.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

In the following description, certain terminology is used to describe certain features of one or more embodiments of the invention. For instance, the term "access point" refers to a device that facilitates wireless connectivity (for wireless communication devices) to a communication or data network. For example, an "access point" may include base stations, Node-B devices, femto cells, pico cells, etc. The terms "client terminal" refer to mobile phones, pagers, wireless modems, personal digital assistants, personal information managers (PIMs), palmtop computers, laptop computers, and/or other mobile communication/computing devices which communicate, at least partially, through a wireless or cellular network.

One feature provides a system and method for facilitating power conservation in a client terminal by using a proxy host terminal to listen for paging messages for the client terminal while the client terminal shuts off its primary communication interface. A client terminal may include a long range communication interface (e.g., a primary or high bandwidth interface) for receiving signals over a long range, and a short range communication interface (or a secondary or low bandwidth interface) for receiving signals over a low range (e.g., a few feet, or less than a mile). In one example, the long range communication interface may be any CDMA compliant device and the short range communication interface may be a Bluetooth compliant interface. One difference between the long and short range communication interfaces is that the short range communication interface may consume less power than the long range communication interface. Consequently, the long range communication interface may also be referred to as a high power communication interface and the short range communication interface may be referred to as a low power communication interface. It should be clear that the terms "high power" and "low power" are relative terms and do not imply a particular level of power consumption. That is, the low power communication interface simply consumes less power than the high power communication interface.

In a prior art approach, the client terminal may be powered by an internal power source (e.g., battery) that powers its communication interfaces. In idle mode, the high power communication interface may be cycled on and off periodically. As a result, the useful life of the internal power source is shortened.

To lengthen the useful life of the internal power source, one feature may provide for the client terminal to power off its high power communication interface while using a proxy host terminal to listen on the client terminal's paging channels for messages from one or more access points. To establish a host terminal as a proxy, the client terminal may scan, within its transmission range, for locally available host terminals. Once available host terminals are detected, the client terminal may determine if any of the available host terminals have a high power interface for monitoring its paging channels and a low power interface for directly communicating with the client terminal.

Once the client terminal has determined the available host terminals with high power interfaces within its transmission range, it may negotiate with one or more of the available host terminals to serve as its proxy. For example, the client terminal may select one host terminal to serve as its "proxy" based on which available host terminal has the best or strongest short range link as measured or perceived at the client terminal low power interface. The client terminal may provide its one or more paging channels and/or associated parameters to the selected host terminal so that the host terminal can listen on, or monitor, the one or more paging channels. In implementations where the selected host terminal and client terminal are both listening to the same access point, their clocks are already synchronized by virtue of listening to the same access point. In an alternative implementation, the client terminal may instead provide clock information for the paging channels so that the host terminal can synchronize its own clock to it. The client terminal may then power down (or turn off) all or part of its high power interface and may activate its low power interface to receive notifications from the host terminal of paging messages received on its paging channels. A paging message may be a message that includes control or data messages and indicates an initiation of communication. As the high power interface consumes more power than the low power interface, shutting the high power interface off and using the low power interface to receive notification of paging messages via a proxy host terminal facilitates power conservation at the client terminal.

The host terminal may then listen for paging messages intended for the client terminal on the client terminal's paging channels initiated or sent by one of more access points. In one example, the host terminal may use its high power interface (similar to the high power interface that has been shut off by the client terminal) to listen for, or receive, the paging messages. When the host terminal detects a paging message intended for a client terminal for which it is acting as a proxy, the host terminal may forward the paging message to the client terminal via its low power interface. The forwarded paging message may include at least a portion of the original paging content, sufficient enough to respond to the paging message, including, but not limited to a traffic channel and a sector. Upon receipt of some or all of the content of the paging message, the client terminal may turn on its high power interface and may respond directly to the access point sending the paging message via its high power interface.

According to another feature, a host terminal may monitor paging channels for multiple client terminals over its high power interface. The host terminal may listen on the paging channels for paging messages intended for the multiple client terminals for which it is acting as a proxy. If a paging message is detected on one of the paging channels being monitored, the host terminal may determine for which of the multiple client terminals being monitored the paging message is intended. The identification or address of the client terminals being monitored by the host terminal may be identified on a proxy list maintained by the host terminal. When a paging message is detected, the host terminal looks up the identity of the corresponding client terminal on the proxy list and forwards the message to its intended recipient via its low power interface.

When the client terminal responds, it may turn on its high power interface and use it to directly communicate with the access point that sent the paging message.

In yet another feature, a proxy host terminal may be a terminal that is battery operated but has a longer battery life or an external power source. For example, if a first client terminal is battery operated but its internal power source is below a desired threshold, it may seek a second local terminal within wireless transmission range (with a longer battery life than the first client terminal) to act as a proxy for the first client terminal. If the second terminal is acting as the proxy for the first client terminal, the first client terminal powers down its high power interface and powers up its low power interface to receive the paging message via the second client terminal's low power interface.

According to yet another feature, a client terminal may periodically transmit a ping over its low power interface to the host terminal to determine if the host terminal is still within range to act as a proxy. If a specified amount of time elapses without a response to the ping from the host terminal, the client terminal may power up its high power interface to receive paging messages directly from the access points as the host terminal is no longer acting as its proxy. If another host terminal is detected within transmission range, the client terminal may associate with the new host terminal, power down its high power interface and activate its low power interface to receive notification of paging messages from the new host terminal.

In another feature, when the host terminal receives a paging message intended for the client terminal via its high power interface, the paging message may be received in a first communication protocol associated with its high power interface. However, to forward the paging message to the client terminal via its low power interface, the paging message may be translated from the first communication protocol into a second communication protocol associated with its low power interface.

According to various implementations, a host terminal may be a mobile phone, cellular phone, laptop computers, personal digital assistant devices, and/or any other device with communication capabilities. In some applications, the functionality and/or operation of a host terminal may be integrated into an access point (e.g., base station, node B, femto cell, pico cell, etc.) that includes both a long range interface (e.g., high power transceiver) and a short range interface (e.g., low power transceiver) that are configured to operate as described herein.

FIG. 1 is a block diagram illustrating a wireless communication system in which one or more host terminals may act as proxies to facilitate power conservation in client terminals. A client terminal 114 and a host terminal 110 may be capable of communicating over a wireless communication network 106. The host terminal 110 and client terminal 114 may access the communication network 106 via one or more access points 104 and 108 (e.g., base stations or Node Bs, femto cells, pico cells, etc.) that are part of the communication network 106.

The host terminal 110 and client terminal 114 may include high power interfaces 109 and 113 (or transceivers) for communicating directly with access points 104 and/or 108 through a wireless link. Furthermore, the host terminal 110 and client terminal 114 may also include low power interfaces 115 and 119 (or transceivers) for communicating directly with each other. In one implementation, the low power interface (e.g., a secondary communication interface, low bandwidth communication interface, or short range communication interface) may consume less power than the high power interface (e.g., a primary communication interface, high bandwidth communication interface, or long range communication interface). It should be clear that the terms "high power" and "low power" are relative terms and do not imply a particular level of power consumption. The low power interfaces 115 and 119 simply consume less power than the high power interfaces 109 and 113 for a given time of operation. Typically, lower bandwidth and/or shorter range interfaces will consume less power than higher bandwidth and/or longer range interfaces. The client terminal 114 may be powered by an internal (limited) power source (e.g., battery).

The client terminal 114 may operate in various modes, including a first (or active) mode and a second (or idle) mode. While in the active mode, the client terminal 114 may use its high power interface to communicate with one or more of the access points 104 and 108 to establish a call/session or respond to a paging message. In idle mode, the client terminal 114 may periodically turn on its high power interface to monitor for paging messages sent by the access points 104 and/or 108. In various implementations, depending on its power limitations, a host terminal may also operate according to such active and idle modes of operation or it may operate in just active mode. For example, if both the client terminal and host terminal are mobile phones, each may operate using active and idle modes to conserve power. On the other hand, if the host terminal is a computer or part of an access point, it may not have significant power restrictions and can operate mostly in active mode.

When a prior art client terminal operates in idle mode, it may continue to consume power from its internal power source as the high power interface is cycled on and off to check for paging messages or change in configuration. As a result, available power continues to decrease, causing the standby time between battery recharges and the available talk time when a call is placed or received to be shortened.

By contrast, the client terminal 114 may be configured for improved power conservation. In a power conservation mode of operation, the client terminal 114 may request that the host terminal 110 act as its proxy for monitoring paging channels for the client terminal 114. The client terminal 114 may find local host terminals by scanning on its high power interface 113 and/or low power interface 119. In some implementations, the low power interface 119 is used to scan for host terminals since it is the interface that will be used to receive paging messages when the client terminal's high power interface 113 is turned off. In performing such scan, the client terminal 114 may attempt to identify potential host terminals that have both a high power interface and a low power interface. This is so that a host terminal is able to receive paging message via its high power interface (e.g., intended for long range communications) and forward them to the intended client terminal via the low power interface.

When one or more host terminals are identified by the client terminal 114, it may select one host terminal 110 to serve as its "proxy" based on which available host terminal has the best or strongest short range link as measured or perceived at the client terminal's low power interface 119. The client terminal may send a proxy request to the selected host terminal 110 along with its paging channel parameters. In some implementations, the client terminal 114 may pre-establish a secure relationship with one or more host terminals. By pre-establishing a secure relationship, the client terminal 114 may trust the selected host terminal 110 acting as its proxy to forward incoming paging messages it detects for the client terminal.

Once a proxy host terminal has been identified and selected, a communication link via the low power interfaces of both the client terminal 114 and host terminal 110 may be established or setup. For example, if the low power interface 119 is a Bluetooth compliant interface, the host terminal 110 may be configured to operate according to a pseudo-random sequence called a hop sequence or frequency hop sequence so that the host terminal 110 and the client terminal 114 can communicate with each other via their respective low power interfaces. Once the selected host terminal 110 has been established as a proxy for the client terminal 114, the high power interface 113 of the client terminal 114 may be powered down (e.g., turned off) to facilitate power conservation. Since the low power interface 119 consumes less power than the high power interface 113, the client terminal 114 conserves power and the life of the internal power source of the client terminal 114 may be extended.

The selected "proxy" host terminal 110 may monitor the paging channels of the client terminal 114 over its high power interface 109 and forward any paging messages (or portion thereof) detected to the client terminal 114 over its low power interface 115. A paging message may include sufficient information to an intended recipient to reply to such message (e.g., accept the call), such as a broadcast control channel number (BCCH), a BCCH time offset, a sector number, etc. For example, a paging message for a CDMA2000-compliant network, may also include the following fields.

| Field | Length (bits) | Description |
| --- | --- | --- |
| CONFIG_MSG_SEQ | 6 | Configuration message sequence number |
| ACC_MSG_SEQ | 6 | Access parameters message sequence number. |
| CLASS_0_DONE | 1 | Class 0 pages done indicator. |
| CLASS_1_DONE | 1 | Class 1 pages done indicator. |
| TMSI_DONE | 1 | TMSI pages done indicator. |
| ORDERED_TMSIS | 1 | TMSIs sent in numerical order. |
| BROADCAST_DONE | 1 | Broadcast pages done indicator. |
| RESERVED | 4 | Reserved bits. |
| ADD_LENGTH | 3 | Number of octets in the page message specific fields. |
| ADD_PFIELD | 8 × add length | Additional page message specific fields. |

The host terminal 110 may similarly act as a "proxy" for a plurality of other client terminals by monitoring their respective paging channels and forwarding paging messages that may be received.

According to one feature, the proxy scheme between the client terminal 114 and the proxy host terminal 110 may be transparent to the rest of the communication system (network) 100 such that access points 104 and 108 do not have to modify their operations. For example, the host terminal 110 may monitor the normal, pre-existing paging channel of the client terminal 114 via its high power interface and is therefore seamless to the rest of the communication system 100 (including access point A 104).

As used herein, an access point may be a device that may communicate with the terminals and may also be referred to as, and include some or all the functionality of, a base station, a Node B, or some other similar devices. A terminal (e.g., client terminal and/or host terminal) may also be referred to as, and include some or all the functionality of, a user equipment (UE), a wireless communication device, a mobile station, computer, laptop, mobile phone, cellular phone, or some other terminology. In some implementations, the operations and/or functionality of a "proxy" host terminal may be integrated in an access point.

Example of Long Range/High Power Communication Interface

One example of a long range, high power, and/or high bandwidth communication interface is a W-CDMA compliant transceiver. However, in other examples, such high power interface may operate according contemporary communication standards, including but not limited to W-CDMA, cdma2000, GSM, WiMax, and WLAN.

In WCDMA, a client terminal may use Discontinuous Reception (DRX) in idle mode of its high power interface in order to reduce power consumption. When DRX is used, the client terminal monitors one Page Indicator, PI, in one Paging Occasion per DRX cycle. The Paging Indicator Channel (PICH) may be a fixed rate (SF=256) physical channel used to carry the paging indicators. The PICH is associated with an Secondary Common Control Physical Channel (S-CCPCH) to which a PCH transport channel is mapped.

Example of Short Range/Low Power Communication Interface

One example of a short range, low power, and/or low bandwidth communication interface is a Bluetooth compliant transceiver that uses a time-division duplex (TDD) scheme. Such Bluetooth interface may alternately transmit and receive in a synchronous manner. This allows a plurality of terminals connected via Bluetooth technology to communicate in an ad hoc fashion often called piconet. The piconet may be synchronized by a system clock of a master terminal, i.e. a terminal that initiates communications with a slave terminal. The Bluetooth Device Address (BD_ADDR) of the master terminal determines the frequency hopping sequence and the channel access code; the system clock of the master terminal determines the phase in the hopping sequence. The master terminal also controls the traffic on the channel by a polling scheme. The master terminal never adjusts its system clock during the existence of the piconet. The slave terminals may adapt their native clocks with a timing offset in order to match the master clock. The Bluetooth clocks may have a resolution of 312.5 microseconds, for example.

The Bluetooth baseband protocol is a combination of circuit and packet switching. Slots may be reserved for synchronous packets. Each packet is transmitted in a different hop frequency. A packet nominally covers a single slot, but can be extended to cover up to five slots, for example. The Bluetooth transmission channel may be divided into 625µ second slots. Transmission occurs in packets that occupy an odd number of slots (1, 3, or 5). In one example, each packet is transmitted on a different hop frequency with a maximum frequency hopping rate of 1600 hops/second in case packets occupy a single slot, and a minimum hopping rate of 320 hops/second in case packets occupy 5 slots. Note that every slot has a frequency associated with it, however transmission of a packet occupying multiple slots may use the frequency associated with the first slot. A slave packet transmission (from a slave terminal) may follow a master packet transmission (from a master terminal). A slave terminal may respond to a master terminal's packet that is specifically addressed to it. In case it does not have any data to send, the slave terminal may send a NULL packet. Moreover, each packet may contain acknowledgement ACK information for the previous packet received.

Normally, a connection between two terminals occurs in the following fashion. A master terminal uses the General Inquiry Access Code (GIAC) and Dedicated Inquiry Access Code (DIAC) to inquire about the Bluetooth devices in the range (Inquire substate). If any nearby Bluetooth device (terminal) is listening for these inquiries (Inquiry scan sub-state), it responds to the master terminal by sending its address and frequency Hop Synchronization (FHS) packet to the master (Inquiry response sub-state). After sending the information, the slave may start listening for page messages from the master terminal (Page scan). The master terminal, after discovering the in-range Bluetooth devices (terminals), may page these slave terminals (Page sub-state) for connection setup. The slave terminal, in page scan mode if paged by this master terminal, responds (Slave response sub-state) with its Device Access Code (DAC). The master terminal, after receiving the response from the slave terminal, may respond by transmitting the master terminal's real time clock, master terminal's BD_ADDR, the BCH parity bits and the class of the master terminal (FHS packet). After slave terminal has received this FHS packet, both enter into Connection state and may start communicating.

During page scan state, a Bluetooth compliant terminal may wait for page requests from other Bluetooth compliant terminals. This page scan state may include alternating scan- and sleep-phases. Two parameters may define the page scan state: the page scan interval Tpage_scan specifies the time between two consecutive scan phases and the page scan window Tpage_scan_window determines the duration of a scan phase. In some implementations of -Bluetooth compliant terminals, the page scan interval can vary from 11.25 milliseconds to 2.56 seconds.

The signaling detection techniques described herein may be used for various wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), cdma2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

Figure 2:
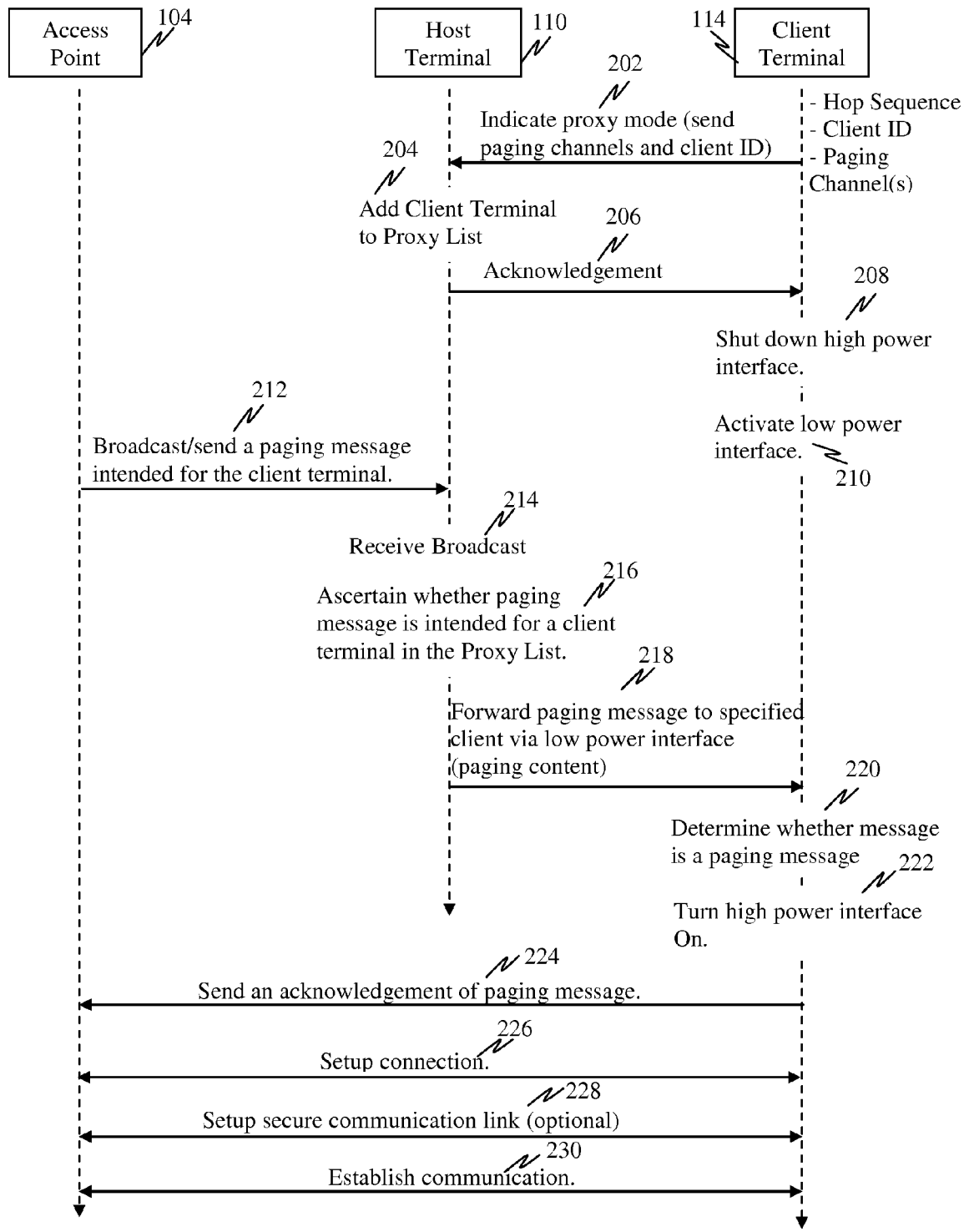
FIG. 2 is a flow diagram illustrating the operation of a wireless communication system in which a host terminal acts as a proxy to facilitate power conservation in client terminals.

FIG. 2 is a flow diagram illustrating the operation of a wireless communication system in which a host terminal acts as a proxy to facilitate power conservation in client terminals. In this example, access point 104, host terminal 110, and client terminal 114 of FIG. 1 are used for illustration purposes. The client terminal 114 may store a Client Identifier (ID), Hop Sequence (e.g., for its low power interface), and/or one or more paging channels associated with the client terminal 114. The host terminal 110 may maintain a client proxy list of the client identifiers and paging channels of the client terminals for which the host terminal 110 is acting as a proxy.

When the client terminal 114 wishes to conserve power, it may indicate to the host terminal 110 to operate as its proxy by sending its paging channels and client ID 202. Using the client terminal ID, the host terminal 110 then adds the address of the client terminal to its proxy list 204 and sends an acknowledgement 206 to the client terminal 114 to acknowledge receipt of the information. After receiving the acknowledgement 206, the client terminal 114 shuts down (or powers down) its high power interface 208 and activates its low power interface 210.

The access point 104 may broadcast/send a paging message (or portion thereof) intended for the client terminal 212. The host terminal 110 may receive the broadcast 214 over its high power interface. In addition to the paging message, the host terminal 110 may also receive additional information (or content of the paging message) from the access point 104, such as details of the traffic channel, the sector, or other information sufficient to reply to the paging message. The host terminal 110 may use the additional information to allow the client terminal 114 to directly respond to the paging message.

In one feature, once the broadcast has been received, the host terminal 110 ascertains whether the paging message is intended for a client terminal 114 in the proxy list 216. The host terminal 110 may forward the paging message to the specified client terminal 114 via its low power interface 218 if the paging message is intended for a client terminal 114 having its paging channels monitored by the host terminal 110. The client terminal 114 may receive the message, via its low power interface, along with the details of the message to determine whether the message is a paging message 220. A portion of the paging content sufficient to allow the client terminal 114 to respond directly to the paging message may be received by the client terminal 114. Unlike the prior art approach, the client terminal 114 does not have to request or re-listen to the paging message again to initiate communications with an access point that originated the paging message.

If the client terminal 114 determines that a paging message has been forwarded on its low power interface, the client terminal 114 may turn on its high power interface 222 and respond directly to the access point 104 sending the paging message. An acknowledgement 224 of the paging message may be sent from the client terminal 114 to the access point 104 via its high power interface to establish direct communications.

In an example of WCDMA systems, once the acknowledgement 224 has been received by the access point 104, a radio resource connection (RRC) connection may be setup 226. Optionally, a secure communication may be setup so that the client terminal 114 may communicate with the access point 104 over a secure connection 228. Finally a communication between the high power interface of the client terminal 114 and the access point 104 may be established 230. The process of instructing the host terminal 110 to act as a proxy for one or more client terminals 114 may be repeated multiple times.

Figure 3:
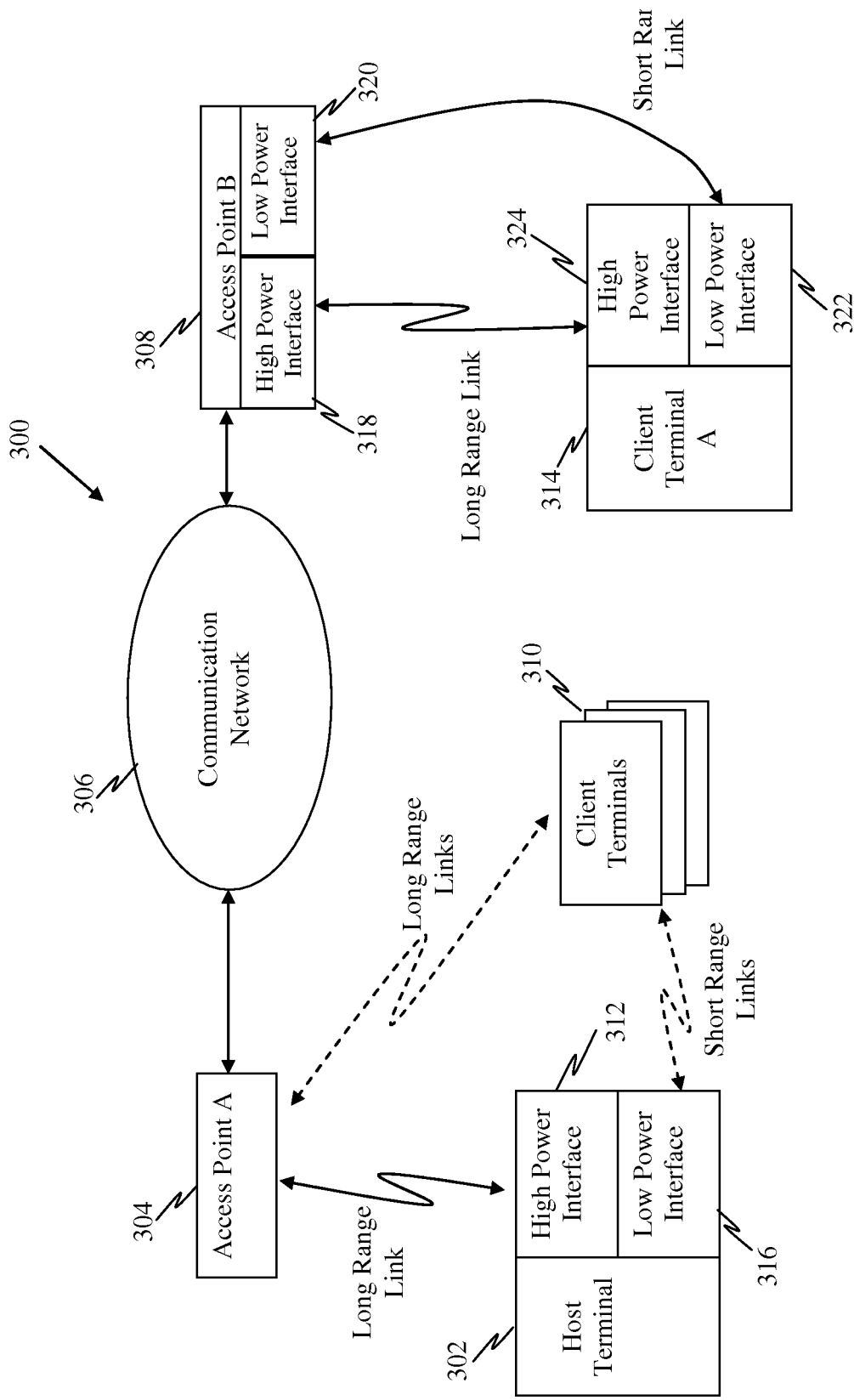
FIG. 3 is a block diagram illustrating another example of a wireless communication system in which one or more host terminals may act as proxies to facilitate power conservation in client terminals.

FIG. 3 is a block diagram illustrating another example of a wireless communication system in which one or more host terminals may act as proxies to facilitate power conservation in client terminals. This example illustrates how a host terminal 302 may serve as a proxy for a plurality of client terminals 310. That is, the plurality of client terminals 310 may select the host terminal 302 as their proxy when they power down (e.g., turn off) their high power interfaces. When operating as a proxy, the host terminal 302 monitors the paging channels for the client terminals 310 and forwards a paging message (if received) to the correspond client terminal. That is, host terminal 302 uses its high power interface 312 (e.g., long range and/or high bandwidth transceiver) to monitor for the paging messages and, if such paging messages are received, uses its low power interface 316 (e.g., short range and/or low bandwidth transceiver) to forward them.

In some implementations, the functionality of a host terminal may be integrated into an access point 308. The access point 308 (e.g., base station, Node B, femto cell, pico cell, etc.) may include a high power interface 318 (e.g., long range and/or high bandwidth transceiver) and a low power interface 320 (e.g., short range and/or low bandwidth transceiver). A client terminal A 314 may identify and designate the access point 308 as its proxy. When acting as a proxy for the client terminal A 314, the access point 308 forwards paging messages to the client terminal A 314 via its low power interface 320. Upon receiving the paging message via its low power interface 322, the client terminal A 314 may then turn on its high power interface 324 and respond to the paging message via the high power interface 324.

Figure 4:
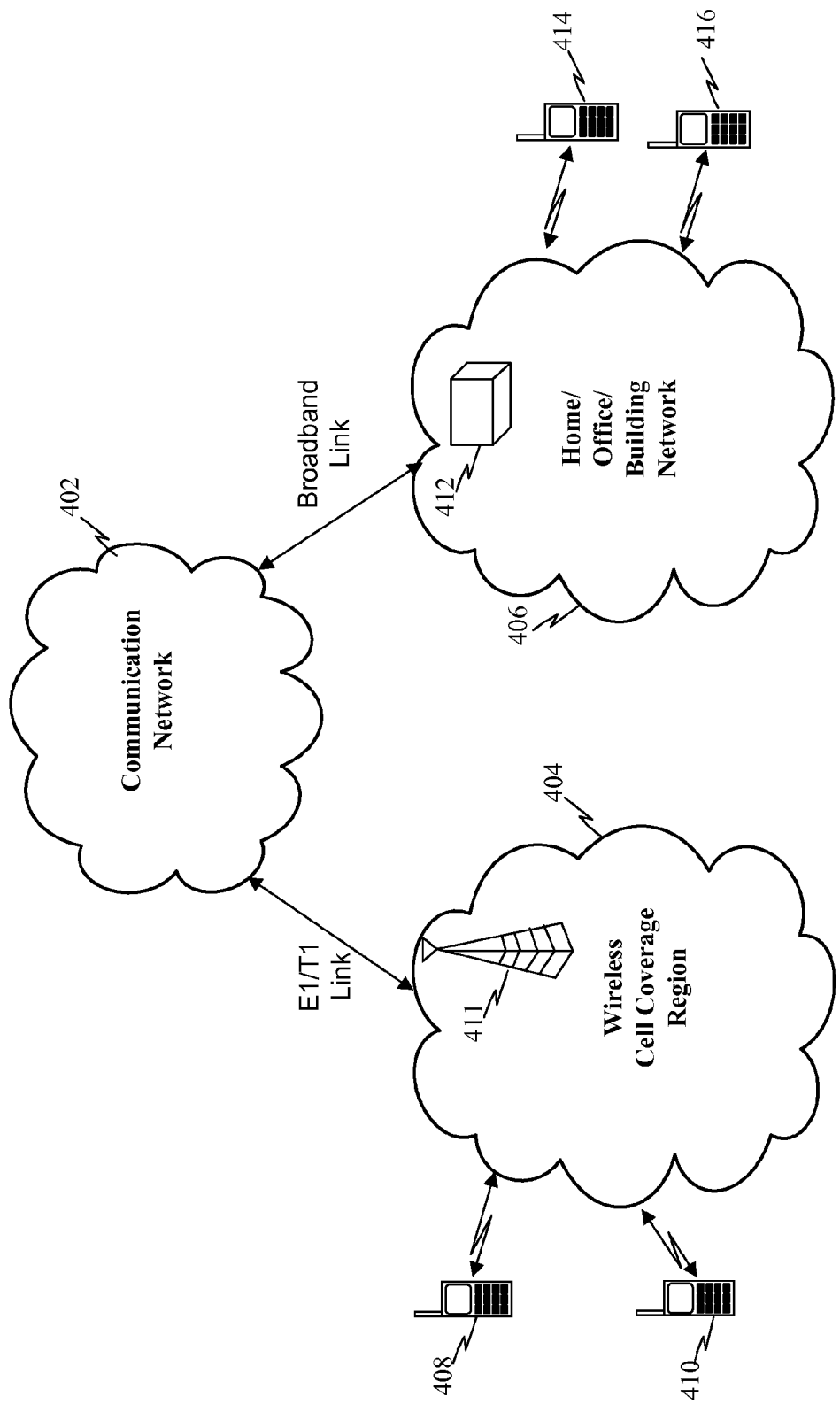
FIG. 4 is a block diagram illustrating yet other examples of wireless communication systems in which one or more proxies may facilitate power conservation in client terminals.

FIG. 4 is a block diagram illustrating yet other examples of wireless communication systems in which one or more proxies may facilitate power conservation in client terminals. This example illustrates how different networks 402, 404, and 406 may be interconnected by high bandwidth links (e.g., broadband, E1/T1, etc) so communications may be carried out between them. Within each network, power conservation of client devices may be implemented by use of the proxy scheme described herein. For instance, in a wireless cell coverage region 404 for a mobile phone network, a plurality of mobile phones (or other communication device) may be served. In this example, a first mobile phone 408 and a second mobile phone 410 may be equipped with a high power interface (e.g., long range, high bandwidth) and a low power interface (e.g., short range, low bandwidth). The first mobile phone 408 may request that a second mobile phone 410 act as its proxy for paging messages, thereby allowing the first mobile phone to conserve power by shutting off (or limiting the "awake" time) of its high power interface.

In an alternative implementation, the base station 411 serving the wireless cell coverage region 404 may have both a high power interface, which is normally used to communication with the mobile phones 408 and 410 being served, and a secondary interface compatible with the low power interfaces of the mobile phones 408 and 410. In this particular configuration, since the secondary interface is located on the base station 411 (which typically has a plentiful power supply), it may be able to boost the operating transmission range of its secondary interface beyond the typical transmission range of the low power interfaces. In this manner, the base station 411 may be able to forward paging messages over its secondary interface to the low power interfaces of mobile phones that have shut off their high power interfaces.

In another example, a home, office, or building wireless network is served by a femto cell 412 or pico cell. The femto cell 412 may provide wireless service to a plurality of mobile phones 414 and 416 (or other communication device) within a localized, limited area (e.g., within a home, office, or building). In this example, the femto cell 412 may have may have both a high power interface, which is normally used to communicate with high power interfaces of the mobile phones 414 and 416 being served, and a low power interface (e.g., short range, low bandwidth, or secondary interface) through which it can communicate with corresponding low power interfaces of the mobile phones 414 and 416. Thus, when a mobile phone designates the femto cell 412 as it proxy (and shuts off the mobile phone's high power interface), the femto cell 412 is able to forward paging messages over their low power interfaces.

Figure 5:
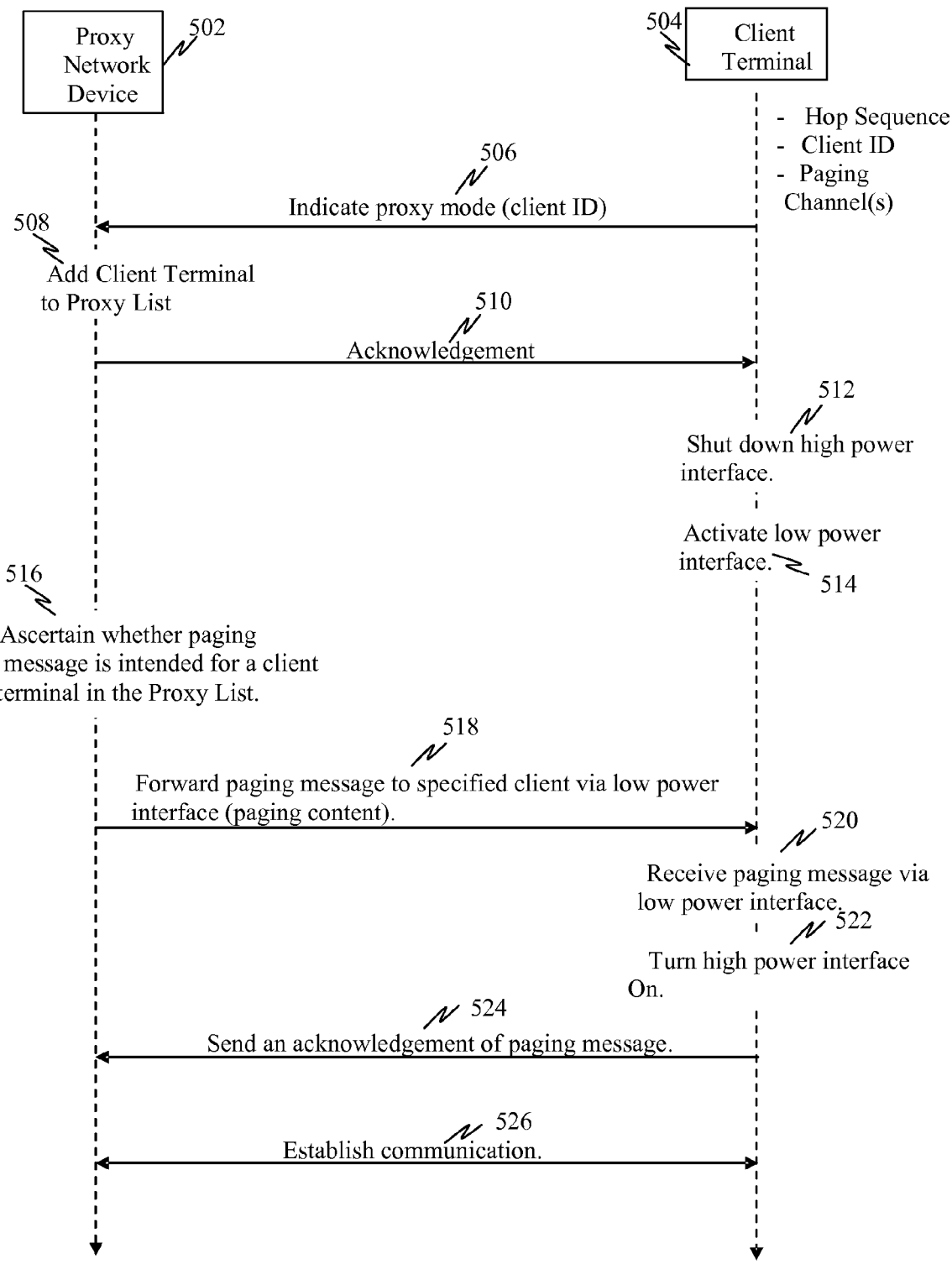
FIG. 5 is a flow diagram illustrating the operation of a wireless communication system in which a proxy device acts facilitates power conservation in client terminals.

FIG. 5 is a flow diagram illustrating the operation of a wireless communication system in which a proxy device acts facilitates power conservation in client terminals. In this example, the proxy network device 502 may be an access point, femto cell, or other network device having both a high power interface and a low power interface. Similarly, the client terminal 504 has a corresponding high power interface and a low power interface. The client terminal 504 may store a Client Identifier (ID), Hop Sequence (e.g., for its low power interface), and/or one or more paging channels associated with the client terminal 504. The proxy network device 502 may maintain a client proxy list of the client identifiers and paging channels of the client terminals for which it has been requested to act as a proxy.

When the client terminal 504 wishes to conserve power, it may indicate to the proxy network device 502 to operate as its proxy. Note that since the proxy network device 502 already provides network access to the client device 504 (e.g., it is the access point for the client device to a communication network) it may already have its paging channel information. The proxy network device 502 add the client terminal 504 to its proxy list 508 and sends an acknowledgement 510 to the client terminal 504 to acknowledge receipt of the information. After receiving the acknowledgement, the client terminal 504 shuts down (or powers down) its high power interface 512 and activates its low power interface 514.

The proxy network device 502 may ascertain whether a new paging message is intended for a client terminal 504 in its proxy list 516. The proxy network device 502 may forward the paging message to the specified client terminal 504 via its low power interface 518 if the paging message is intended for the client terminal 504. The client terminal 504 may receive the paging message via its low power interface 520. A portion of the paging content sufficient to allow the client terminal 504 to respond directly to the paging message may be received by the client terminal 504. Unlike the prior art approach, the client terminal 504 does not have to request or re-listen to the paging message again to initiate communications with a network device that originated the paging message.

Upon receiving a paging message via its low power interface, the client terminal 504 may turn on its high power interface 522 to respond directly to the proxy network device 502. An acknowledgement 524 of the paging message may be sent from the client terminal 504 to the proxy network device 502 via its high power interface to establish direct communications 526.

Figure 6:
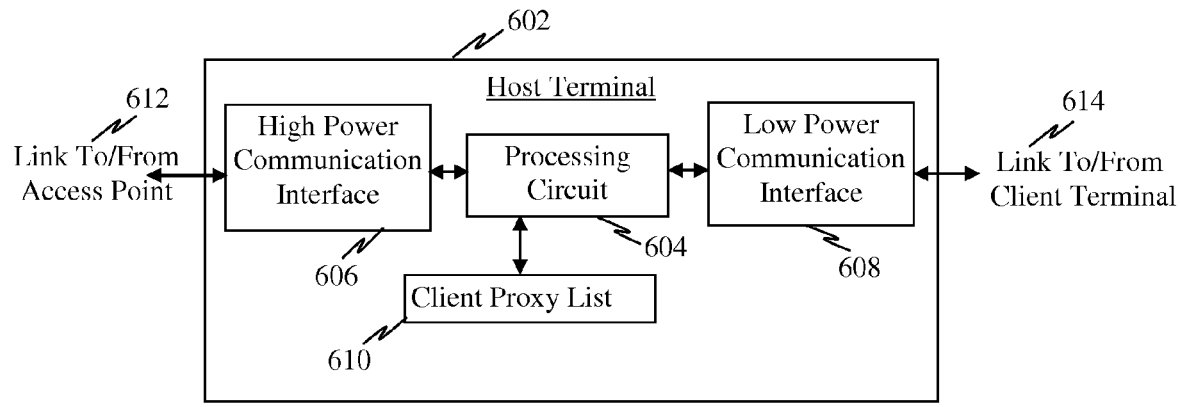
FIG. 6 is a block diagram of an example of a host terminal configured to act as a proxy to facilitate power conservation in client terminals

FIG. 6 is a block diagram of an example of a host terminal configured to act as a proxy to facilitate power conservation in client terminals. The host terminal 602 may include a processing circuit 604 and a high power communication interface 606 used to couple the host terminal 602 to an access point 612. For example, the high power communication interface 606 may be used for long range communications, such as over a CDMA-compliant network. A low power communication interface 608 may be used to couple the host terminal 602 to a client terminal 614. For example, the low power communication interface 608 may be used for short range communications, such as over a Bluetooth-compliant network.

In one mode of operation, the host terminal 602 may be configured to monitor paging channels for client terminals identified on a client proxy list 610 via its high power interface. That is, the host terminal 602 may have agreed to act as a proxy for one or more client terminals. In such proxy mode, the host terminal 602 may use its high power interface to monitor the paging channel(s) associated with the client terminals for which it agreed to act as a proxy. If a message is received in a paging channel, the host terminal 602 may forward all or part of that message through its low power communication interface 608 via a link to the corresponding client terminal 614. In forwarding the message, the host terminal 602 may translate it from a first protocol (associated with the high power communication interface 606) to a second protocol (associated with the low power communication interface 608).

Figure 7:
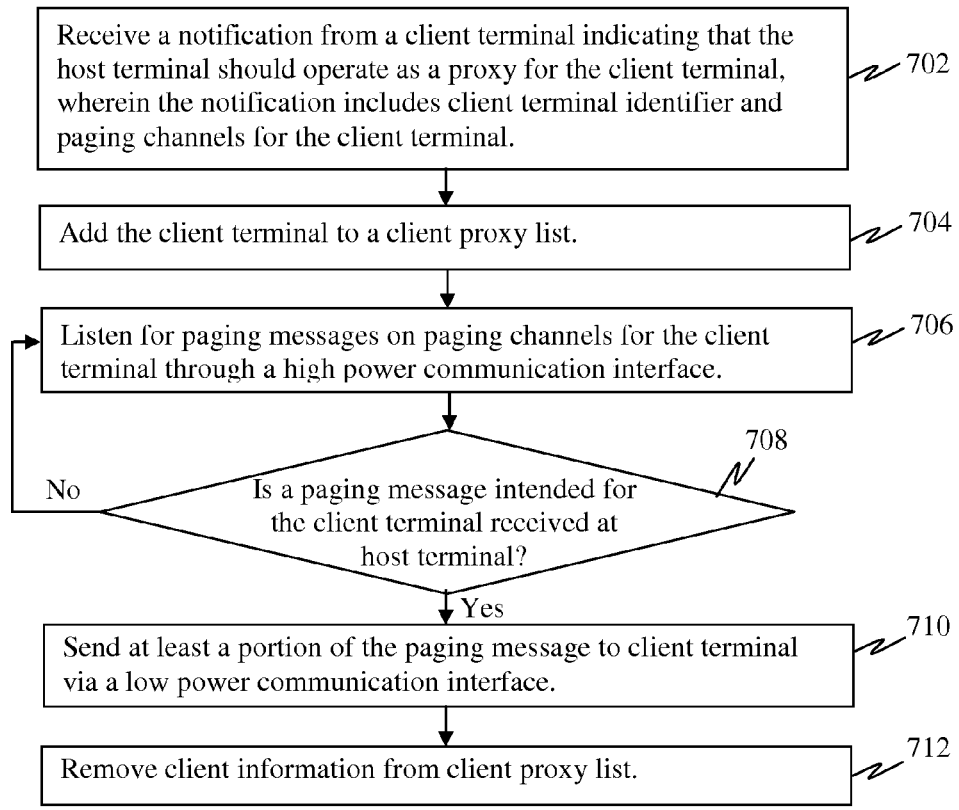
FIG. 7 is a flow diagram illustrating a method operational in a host terminal for facilitating power conservation in client terminals.

FIG. 7 is a flow diagram illustrating a method operational in a proxy host terminal for facilitating power conservation in client terminals. A notification, including a client terminal identifier and paging channel associated with the client terminal, may be received from a client terminal indicating that the host terminal may operate as a proxy for the client terminal 702. Such notification may be received on either a high power communication interface or a low power communication interface of the host terminal. The client identifier and paging channels associated with the client terminal may then be added to a client proxy list on the host terminal 704.

The host terminal may then listen for paging messages on the paging channels for the client terminal through a high power communication interface 706. For instance, if a Bluetooth compliant communication interface is use as the low power communication interface, it may remain active in Page Scan mode (i.e. the host terminal may start listening for page messages) or Sniff mode (i.e. the host terminal may start listening for page messages at a reduced rate or lower duty cycle). The host terminal may determine whether the received paging message is intended for a client terminal on the proxy list 708. If no paging messages for the client terminals in the proxy list are received, the host terminal may continue to listen for paging messages on the paging channels for the client terminal via its high power communication interface 706. If the host terminal receives a paging message that is meant for a client terminal on the proxy list, the host terminal forwards at least a portion of the paging message content for the client terminal via its low power communication interface 710. The portion of the paging message is sufficient to allow the receiving client terminal to respond to the paging message directly to the sending access point. The paging content may include, but is not limited to the sector, the traffic or frequency channel along with any other information used by the client terminal to establish communications with the host terminal. Once the paging message has been forwarded to the corresponding client terminal, the client terminal may be removed from the client proxy list 712 of the host terminal.

Figure 8:
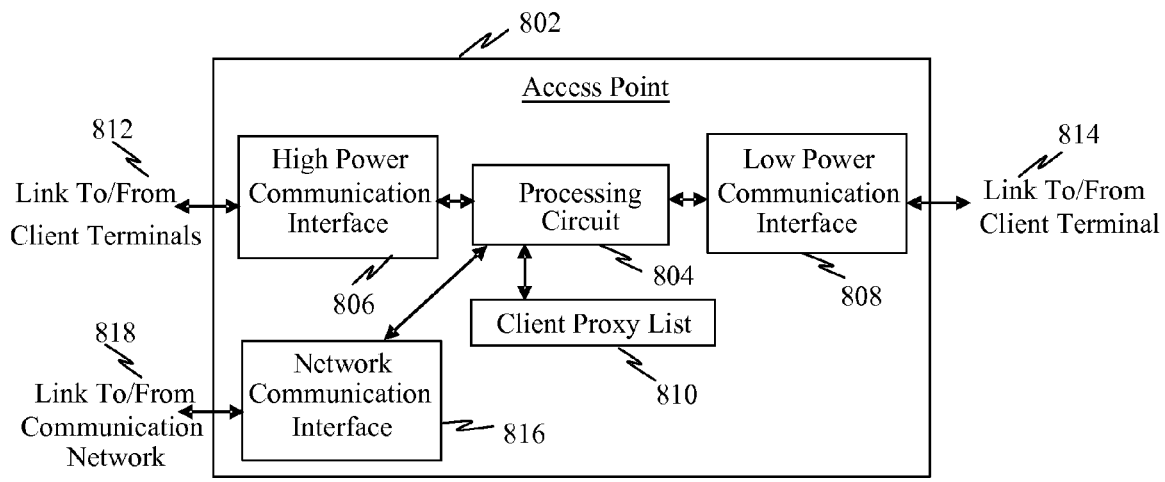
FIG. 8 is a block diagram of an example of an access point configured to act as a proxy to facilitate power conservation in client terminals that it serves.

FIG. 8 is a block diagram of an example of an access point configured to act as a proxy to facilitate power conservation in client terminals that it serves. The access point 802 may be, for example, a femto cell, pico cell, base station, or other network device that links to a communication network 818 via a network communication interface 816 to facilitate communications to and/or from client terminals which it serves. The access point 802 may also include a processing circuit 804 and a high power communication interface 806 (e.g., a long range transceiver, such as over a CDMA-compliant transceiver) to communicate with client terminals (e.g., mobile phones, etc.) being served by the access point 802. A low power communication interface 808 may be used to allow the access point 802 to link with the client terminals 814 for which it operates as a proxy. For example, the access point 802 may have been notified by one or more of its client terminals that it should operate as their proxy. Such one or more client terminals are added to a client proxy list 810. This enables the client terminals to shut off their high power interface, thereby conserving power.

If the access point 802 receives a paging message via the network communication interface 816, it checks whether it is intended for a client terminal in its client proxy list 810. If so, the access point 802 sends the paging message (or portion thereof) via its low power communication interface 808 to the intended client terminal. Otherwise, the access point 802 sends or broadcasts the paging message via its high power communication interface 812. In response to such paging message (either via the low power interface or high power interface), the access point 802 may receive a response via its high power communication interface 812 from the intended recipient client terminal.

Figure 9:
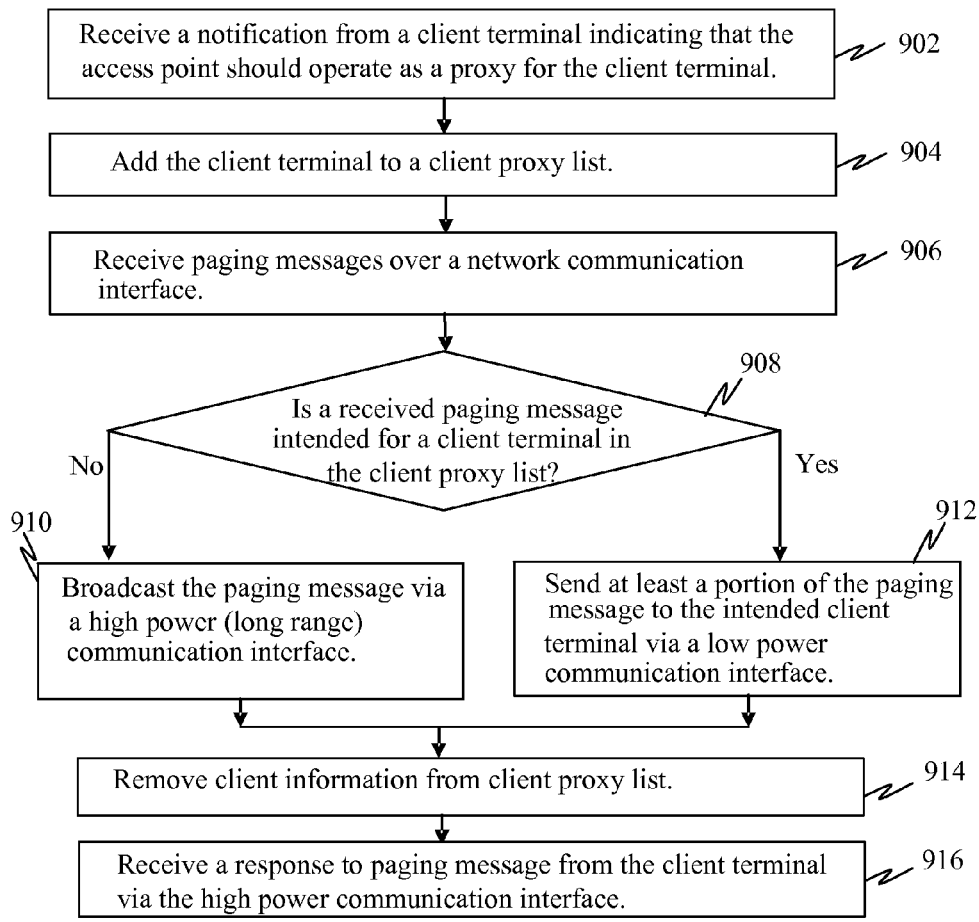
FIG. 9 is a flow diagram illustrating a method operational in an access point for facilitating power conservation in client terminals which it serves.

FIG. 9 is a flow diagram illustrating a method operational in an access point for facilitating power conservation in client terminals which it serves. A notification may be received from a client terminal indicating that the access point should operate as a proxy for the client terminal 902. Such notification may be received on either a high power communication interface or a low power communication interface of the access point. Note that the paging channels associated with the client terminal are already known to the access point by virtue of providing service to the client terminal. The access point adds the client terminal to a client proxy list 904. The access point may receive paging messages over a network communication interface 906. Such network communication interface may couple the access point to an extended network infrastructure. The access point may determine whether a received paging message is intended for a client terminal on the proxy list 908. If the intended client terminal is not in the client proxy list, the paging message is broadcasted via a high power (long range) communication interface 910. Otherwise, if the intended client terminal is in the proxy list, the access point sends at least a portion of the paging message content to the intended client terminal via a low power communication interface 912. The portion of the paging message is sufficient to allow the receiving client terminal to respond to the paging message directly to the sending access point. Once the paging message has been forwarded to the corresponding client terminal, the client terminal may be removed from the client proxy list 914 of the access point. The access point may receive a response to the paging message from the client terminal via the high power communication interface 916.

Figure 10:
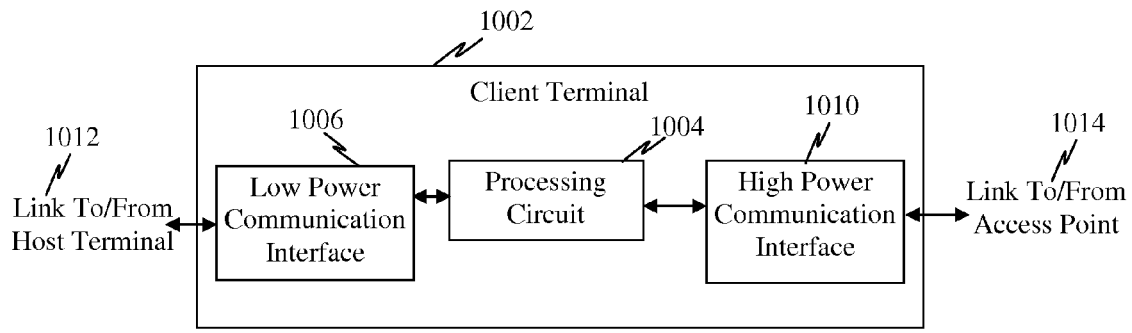
FIG. 10 is a block diagram of an example of a client terminal configured for power conservation by using a proxy host terminal.

FIG. 10 is a block diagram of an example of a client terminal configured for power conservation by using a proxy host terminal. The client terminal 1002 may include a processing circuit 1004, such as a small and/or low-power microprocessor. The client terminal 1002 may also include a low power communication interface 1006 used to couple the client terminal 1002 to devices on a first wireless network, such as linking to host terminals 1012. For example, the low power communication interface 1006 may be used for short range communications, such as over a Bluetooth-compliant network. A high power communication interface 1010 may be used to allow the client terminal 1002 to communicate with devices on a second wireless network, such as linking to network access points 1014. For example, the high power communication interface 1010 may be used for long range communications, such as over a CDMA-compliant network. The client terminal 1002 may be battery-powered and the amount of power such battery can provide is limited.

In prior art approaches, the high power communication interface of the client terminal is powered on to listen for paging messages, at least during certain time intervals, draining the power from an internal power source (e.g., battery) of the client terminal. For instance, a paging channel may be divided into numbered frames. The client terminal may be assigned specific frames on which it may receive terminal-specific messages. With such a paging channel, the client terminal can enter discontinuous reception (DRX) operation whereby it periodically, rather than continuously, monitors the paging channel for messages using its high power interface. While in DRX operation, the client terminal wakes up from a "sleep" state prior to its assigned frame, enters an "awake" state and processes or monitors the paging channel for messages, and reverts back to the sleep state if additional communication is not required. Although such prior art client terminal is not continuously powered up for monitoring paging channels, it is still powered up at pre-determined intervals which drain the internal battery of the client device.

By contrast, the client terminal 1002 may be configured to achieve improved power savings by using a proxy host terminal. The client terminal 1002 requests that a host terminal 1012 act as its proxy to monitor its paging channels. The client terminal 1002 then turns off its high-power communication interface 1010 to conserve power. The client terminal 1002 may then monitor its low power communication interface 1006 to determine if the host terminal 1012 has forwarded at least a portion of a paging message intended for the client terminal 1002. If the at least a portion of a paging message is received on the low power communication interface 1006, the client terminal 1002 then responds via its high power communication interface 1010 to the access point 1014 that initiated or sent the paging message.

Figure 11:
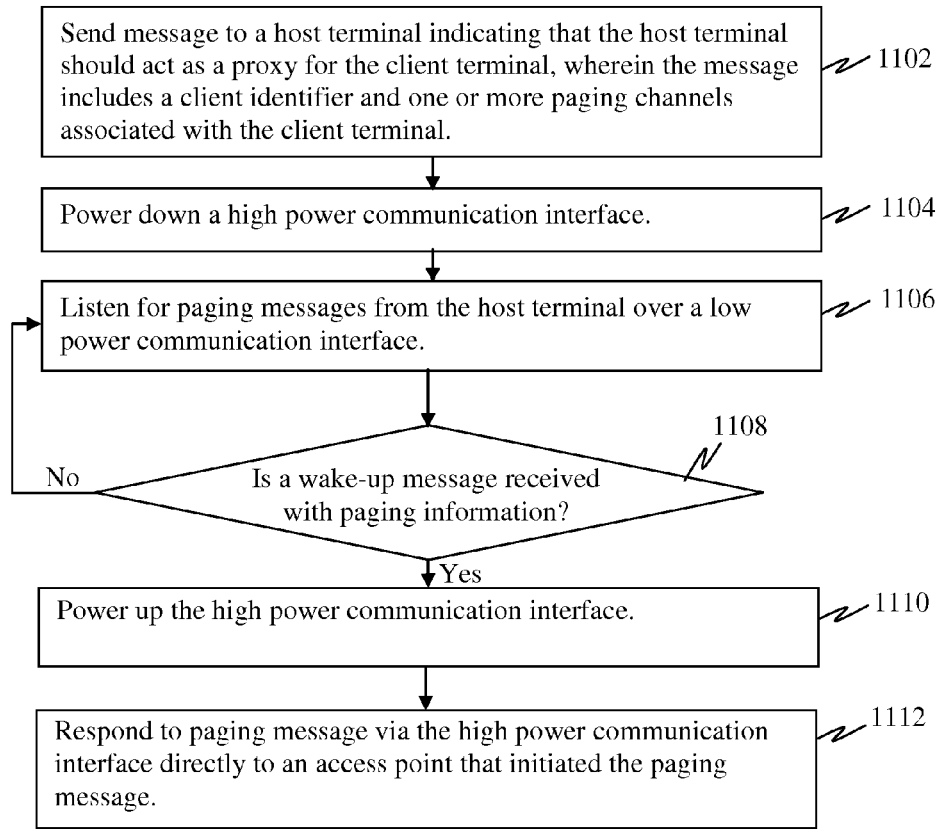
FIG. 11 is a flow diagram illustrating a method operational in a client terminal for power conservation by using a proxy host terminal.

FIG. 11 is a flow diagram illustrating a method operational in a client terminal for power conservation by using a proxy host terminal. Initially, a message, which may include a client identifier and one or more paging channels associated with the client terminal, may be sent to a host terminal indicating that the host terminal should act as a proxy for the client terminal 1102. The client terminal may then power down its high power communication interface 1104. The client terminal may then listen for paging messages from the host terminal over a low power communication interface 1106. The client terminal may determine whether a wake-up message is received with the paging information 1108. If not, the client terminal may continue to listen for paging messages from the host terminal over its low power communication interface 1106. Otherwise, the client terminal may power up its high power communication interface 1110. Once the high power communication interface has been powered up, the client terminal may use it to respond directly to the access point that initiated the paging message.

By powering down the high power communication interface of the client terminal and using a host terminal (or proxy) to monitor the client terminal's paging channels for paging messages, power is conserved. Consuming less power allows a client terminal to operate longer on a given battery charge, and therefore extend the standby time of the client terminal. Since client terminals are typically used in mobile telecommunications, it is often necessary to go extended periods of time without recharging or replacing the battery of the client terminal. Thus, in order to provide increased convenience, and to reduce the likelihood of missing paging messages due to battery depletion, extending the standby time for a given battery size is highly desirable.

In the prior art approaches, the client terminal spends most of the time in the idle mode which, as described previously. For example, in the case of W-CDMA, the idle time may be as much as 99%. However, even in idle mode, the client terminal is nevertheless consuming power as it cycles its high power communication interface on and off to listen for paging messages on its associated paging channels. Consequently, as discussed above, for a CDMA (including WCDMA) compliant prior art client terminal, current consumption in idle mode may be in the range of 2.5 to 3 mA.

However, by shutting off the high power communication interface of a client terminal for longer periods of time and relying on paging notifications from a proxy host terminal via a low power communication interface, power consumption may be significantly reduced. For instance, the low power communication interface (e.g., Bluetooth interface in Page Scan mode) may be as low as 0.3 mA and may be reduced further if a sniff mode is used. For example, current consumption may be reduced to 0.03 mA with a 1.3 second sniff cycle using the low power communication interface. By reducing idle power consumption and/or completely turning off the high power communication interface of the client terminal, the life of the internal battery or power source may be extended.

One or more of the components, steps, and/or functions illustrated in FIGS. 1, 2, 3, 4, 5, 6, 7, 8, 9, 10 and/or 11 may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in FIGS. 1, 3, 4, 6, 8 and/or 10 may be configured to perform one or more of the methods, features, or steps described in FIGS. 2, 5, 7, 9 and/or 11. The novel algorithms described herein may be efficiently implemented in software and/or embedded in hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A host terminal comprising:
    a first communication interface for communicating with an access point via a first long range link;
    a second communication interface for communicating with a client terminal via a second link, wherein the first communication interface has a greater bandwidth than the second communication interface;

a processing circuit coupled between the first communication interface and the second communication interface, the processing circuit configured to:

receive a notification from the client terminal to operate as a proxy for the client terminal, wherein the client terminal is configured to listen for paging messages on paging channels over the first long range link;

listen for paging messages on paging channels for the client terminal via the first communication interface over the first long range link; and send at least a portion of a received paging message to the client terminal via the second communication interface over the second link, wherein the portion of the paging message sent by the host terminal is sufficient for the client terminal to respond to the paging message directly to the access point.

2. The host terminal of claim 1, wherein the processing circuit is further configured to:
add the client terminal to a proxy list; and
remove the client terminal from the proxy list after the portion of the paging message is sent to the client terminal.

3. The host terminal of claim 1, wherein the processing circuit is further configured to:
translate the portion of the paging message from a first communication protocol associated with the first communication interface to a second communication protocol associated with the second communication interface.

4. The host terminal of claim 1, wherein the first communication interface is a Code Division Multiple Access (CDMA) compliant interface and the second communication interface is any Bluetooth compliant interface.

5. The host terminal of claim 1, wherein the first communication interface consumes relatively more power than the second communication interface for a given time of operation.

6. The host terminal of claim 1, wherein the notification from the client terminal includes a client identifier and one or more paging channels associated with the client terminal.

7. The host terminal of claim 1, wherein the processing circuit is further configured to:
acknowledge the notification from the client terminal to operate as the proxy.

8. The host terminal of claim 1, wherein the portion of the paging message includes at least one of a traffic channel and a sector.

9. The host terminal of claim 1, wherein the first communication interface has a longer range than the second communication interface.

10. The host terminal of claim 1, wherein at least one of the first communication interface and the second communication interface is a wireless communication interface.

11. The host terminal of claim 1, wherein the processing circuit is further configured to:
transmit on both the first long range link and the second link to be discoverable during a scan by the client terminal for a proxy.

12. A method operational on a host terminal comprising:
receiving a notification from a client terminal to operate as a proxy for the client terminal, wherein the client terminal is configured to listen for paging messages on paging channels over a first long range link;
listening for paging messages on paging channels for the client terminal via a first communication interface over the first long range link; and
sending at least a portion of a paging message to the client terminal via a second communication interface over a second link, wherein the portion of the paging message sent by the host terminal is sufficient for the client terminal to respond to the paging message directly to the access point and wherein the first communication interface has a greater bandwidth than the second communication interface.

13. The method of claim 12, further comprising:
adding the client terminal to a proxy list; and
removing the client terminal from the proxy list after the portion of the paging message is sent to the client terminal via the second communication interface.

14. The method of claim 12, further comprising:
translating the portion of the paging message from a first communication protocol associated with the first communication interface to a second communication protocol associated with the second communication interface.

15. The method of claim 12, wherein the first communication interface consumes relatively more power than the second communication interface for a given time of operation.

16. The method of claim 12, wherein the host terminal operates as a proxy for a plurality of client terminals by monitoring paging channels associated with the plurality of client terminals.

17. The method of claim 12, further comprising:
transmitting data on both the first long range link and the second link so that it is discoverable during a scan by the client terminal for a proxy.

18. A host terminal comprising:
means for receiving a notification from a client terminal to operate as a proxy for the client terminal, wherein the client terminal is configured to listen for paging messages on paging channels over a first long range link;
means for listening for paging messages on paging channels for the client terminal via a first communication interface over the first long range link; and
means for sending at least a portion of a paging message to the client terminal via a second communication interface over a second link, wherein the portion of the paging message sent by the host terminal is sufficient for the client terminal to respond to the paging message directly to the access point and wherein the first communication interface has a greater bandwidth than the second communication interface.

19. The host terminal of claim 18, further comprising:
means for translating the portion of the paging message from a first communication protocol associated with the first communication interface to a second communication protocol associated with the second communication interface.

20. The host terminal of claim 18, wherein the first communication interface has a longer range than the second communication interface.

21. The host terminal of claim 18, further comprising:
means for adding the client terminal to a proxy list; and
means for removing the client terminal from the proxy list after the portion of the paging message is sent to the client terminal via the second communication interface.

22. The host terminal of claim 18, further comprising:
means for transmitting data on both the first long range link and the second link so that it is discoverable during a scan by the client terminal for a proxy.

23. A non-transitory processor readable medium having stored thereon instructions operational on a host terminal for facilitating power consumption in client terminals configured to cause a processor to perform operations comprising:

receiving a notification from a client terminal to operate as a proxy for the client terminal, wherein the client terminal is configured to listen for paging messages on paging channels over a first long range link;
listening for paging messages on the paging channels for the client terminal via a first communication interface over the first long range link; and
sending at least a portion of a paging message to the client terminal via a second communication interface over a second link, wherein the portion of the paging message sent by the host terminal is sufficient for the client terminal to respond to the paging message directly to the access point and wherein the first communication interface has a greater bandwidth than the second communication interface.

24. The non-transitory processor readable medium of claim 23, further having one or more instructions which when executed by a processor causes the processor to:
translate the portion of the paging message from a first communication protocol associated with the first communication interface to a second communication protocol associated with the second communication interface.

25. The non-transitory processor readable medium of claim 23, wherein the first communication interface consumes relatively more power than the second communication interface for a given time of operation.

26. The non-transitory processor readable medium of claim 23, further having stored thereon one or more instructions which when executed by a processor cause the processor to:
add the client terminal to a proxy list; and
remove the client terminal from the proxy list after the portion of the paging message is sent to the client terminal via the second communication interface.

27. The non-transitory processor readable medium of claim 23, further having one or more instructions which when executed by a processor causes the processor to:
transmit data on both the first long range link and the second link so that it is discoverable during a scan by the client terminal for a proxy.

28. A host terminal comprising:
a first communication interface for communicating with an access point via a first long range link;
a second communication interface for communicating with a client terminal via a second link;
a processing circuit coupled between the first communication interface and the second communication interface, the processing circuit configured to:
receive a notification from the client terminal to operate as a proxy for the client terminal, wherein the client terminal is configured to listen for paging messages on paging channels over the first long range link, wherein the notification from the client terminal further includes a channel identifier, a time offset, and a sector of the first long range link associated with the client terminal;
listen for paging messages on the paging channels for the client terminal via the first communication interface over the first long range link; and
send at least a portion of a received paging message to the client terminal via the second communication interface over the second link, wherein the portion of the paging message sent by the host terminal is sufficient for the client terminal to respond to the paging message directly to the access point.

29. A method operational on a host terminal comprising:
receiving a notification from a client terminal to operate as a proxy for the client terminal, wherein the client terminal is configured to listen for paging messages on paging channels over a first long range link, wherein the notification from the client terminal further includes a channel identifier, a time offset, and a sector of the first long range link associated with the client terminal;
listening for paging messages on the paging channels for the client terminal via a first communication interface over the first long range link; and
sending at least a portion of a paging message to the client terminal via a second communication interface over a second link, wherein the portion of the paging message sent by the host terminal is sufficient for the client terminal to respond to the paging message directly to the access point.

30. A host terminal comprising:
means for receiving a notification from a client terminal to operate as a proxy for the client terminal, wherein the client terminal is configured to listen for paging messages on paging channels over a first long range link, wherein the notification from the client terminal further includes a channel identifier, a time offset, and a sector of the first long range link associated with the client terminal;
means for listening for paging messages on the paging channels for the client terminal via a first communication interface over the first long range link; and
means for sending at least a portion of a paging message to the client terminal via a second communication interface over a second link, wherein the portion of the paging message sent by the host terminal is sufficient for the client terminal to respond to the paging message directly to the access point.

31. A non-transitory processor readable medium having stored thereon instructions operational on a host terminal for facilitating power consumption in client terminals configured to cause a processor to perform operations comprising:
receiving a notification from a client terminal to operate as a proxy for the client terminal, wherein the client terminal is configured to listen for paging messages on paging channels over a first long range link, wherein the notification from the client terminal further includes a channel identifier, a time offset, and a sector of the first long range link associated with the client terminal;
listening for paging messages on the paging channels for the client terminal via a first communication interface over the first long range link; and
sending at least a portion of a paging message to the client terminal via a second communication interface over a second link, wherein the portion of the paging message sent by the host terminal is sufficient for the client terminal to respond to the paging message directly to the access point.

* * * * *